Nov. 6, 1945.    R. R. STEWART ET AL    2,388,622
LATHE DOG
Filed May 31, 1943
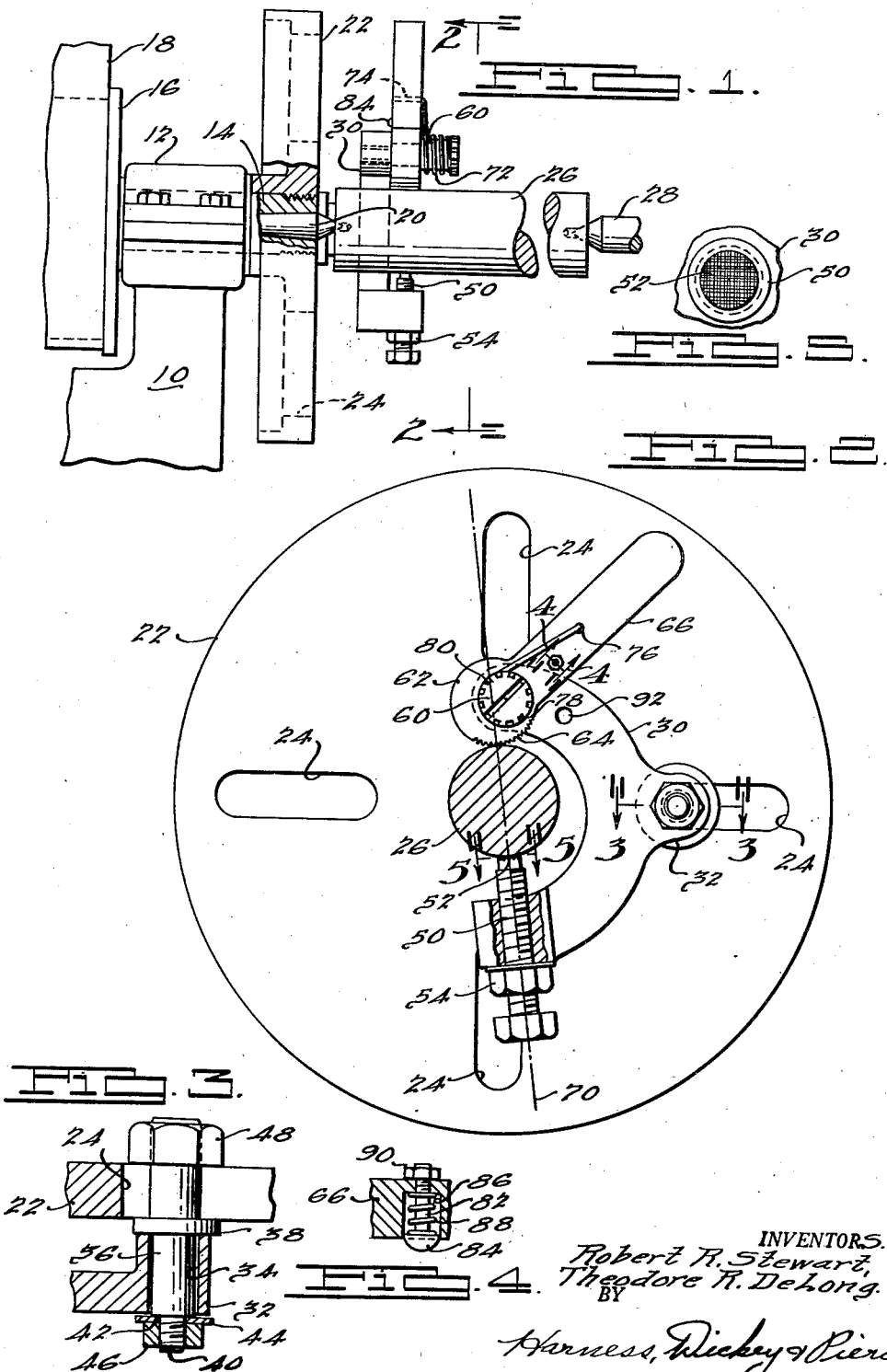
INVENTORS.
Robert R. Stewart,
Theodore R. DeLong.
BY
Harness, Dickey & Pierce Patented Nov. 6, 1945

2,388,622

UNITED STATES PATENT OFFICE 2,388,622

LATHE DOG

Robert Roe Stewart, Findlay, and Theodore R. De Long, Van Buren, Ohio, assignors to William E. Mize, Detroit, Mich.

Application May 31, 1943, Serial No. 489,192

13 Claims. (Cl. 82—42)

This invention relates to lathe dogs and has for its principal object the provision of an improved lathe dog by means of which work mounted between centers in a lathe or the like may be drivingly connected to the spindle in a quicker, easier, and consistently in a more secure manner than by the use of conventional lathe dogs.

Objects of the invention include the provision of a lathe dog which is carried by the face plate of a lathe or the like rather than by the work; the provision of a lathe dog adapted to be secured to the face plate of a lathe or the like and which will automatically lock the work to the face plate for equal turning therewith as soon as the face plate is rotated; the provision of a lathe dog adapted to be secured to the face plate of a lathe or the like and automatically operated under the centrifugal force to which it is subjected in turning to drivingly grip an associated piece of work; the provision of a lathe dog of the type described so constructed and arranged as to increase its grip upon the work with increased resistance to rotation of the workpiece through engagement with a cutting tool or for other reasons; and the provision of a lathe dog of the type described so constructed and arranged as to automatically adjust itself for proper alignment with a piece of work engaged thereby.

Other objects of the invention include the provision of a lathe dog comprising a yoke-like member adapted to be swively secured to the face plate of a lathe in such position as to receive work to be turned within the yoke thereof, one arm of the yoke being provided with a work engaging surface and the opposite arm of the yoke being provided with a gripping cam operable to force the work into contact with the first-mentioned gripping surface; the provision of a construction as above described in which the first-mentioned gripping surface is adjustable radially of a piece of work to be received thereby; the provision of a construction as above described in which the cam means is serrated or otherwise roughened to enhance its driving effect upon a piece of work engaged thereby; the provision of a construction as above described in which the cam member is provided with eccentric mass operable under the influence of centrifugal force to which it is subjected in operation to move the cam member into work gripping position; the provision of a construction as above described in which the eccentric mass constitutes an operating handle for the cam member; the provision of a construction as above described in which the cam member is so positioned that resistance to turning of the workpiece engaged thereby serves to increase the gripping effect of the member thereon; the provision of a lathe dog as above described in which spring means are provided for constantly urging the cam member toward work engaging position; the provision of a construction as above described in which means are provided for releasably locking the cam member in open or work receiving position; and the provision of a lathe dog of the type described mounted on an associated face plate for both oscillatable and a limited amount of relative universal movement with respect thereto.

The above being among the objects of the present invention the same consists in certain novel details of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a partially broken, partially sectioned side elevational view of a portion of the head stock of a lathe, showing a piece of work mounted on a center carried by the spindle thereof and secured to the face plate by a lathe dog constructed in accordance with the present invention;

Fig. 2 is an enlarged face view of the face plate shown in Fig. 1 with our improved lathe dog mounted thereon, the same constituting a vertical sectional view taken on the line 2—2 of Fig. 1;

Fig. 3 is an enlarged fragmentary, transverse, sectional view taken on the line 3—3 of Fig. 2 and illustrating the form of connection between our improved lathe dog and the face plate of a lathe;

Fig. 4 is an enlarged fragmentary, transverse, sectional view taken on the line 4—4 of Fig. 2 and illustrating the spring pressed detent employed for releasably locking the cam member in open position; and, Fig. 5 is an enlarged end view of the stop screw providing an abutment for the work on the side thereof opposite the cam member.

As is understood by those skilled in the art, when it is desired to turn certain types of work in a lathe the work is mounted between centers, one in the head stock and one in the tail stock. Before mounting the work between the centers a conventional lathe dog is secured in surrounding relation with respect to the work and when the work is mounted between the centers the tail of the dog is inserted in a slot in a face plate mounted on the spindle of the lathe. Conventional lathe dogs are provided with a clamping screw for securing the dog to the work and it is thus necessary for the workman to apply the dog to the work, manually tighten it up on the work, and again unloosen it and remove it when the operation on the work has been completed in the lathe. Furthermore in applying the dog to the work the workman must usually exercise some judgment in properly locating the dog on the work as otherwise interference may develop between the dog and the face plate or between the dog and the tool used for machining the work. Furthermore, conventional types of dogs are liable to undesirably mark the work.

In accordance with the present invention a lathe dog is provided that eliminates the necessity of the workman or lathe operator from manually applying it to and removing it from the work, and eliminates the necessity of the lathe operator from tightening it up on the work inasmuch as it accomplishes this operation automatically under centrifugal force when the lathe is operated. The dog of the present invention is secured to the face plate of the lathe and remains in such position when the work is removed from and applied to the lathe between the centers thereof. Being mounted on the face plate it always assumes the same position with respect to the work when the latter is mounted between the centers of the lathe. It, therefore, disposes of all of the disadvantages of conventional lathe dogs and where a large number of pieces of the same size are to be turned between centers in a lathe effects a material saving in time. Moreover, the lathe dog of the present invention is so constructed and arranged that the more resistance applied to the work tending to hold it against rotation the greater the gripping effect of the lathe dog on the work, this feature insuring against possible slippage of the work with respect to the lathe spindle at all times.

Referring now to the accompanying drawing, in Fig. 1 at 10 is illustrated a portion of a head stock of a lathe carrying the front spindle bearing 12 in which the usual spindle 14 is rotatably supported. The lathe may be of any suitable type and driven in any suitable manner but as a matter of illustration the spindle 14 is shown as being provided with a cone pulley 16 mounted thereon and driven by a belt 18. The forward or righthand end of the spindle 14 is shown as being provided with a conventional center 20 conventionally mounted therein and a conventional type of face plate 22 mounted thereon, the face plate being conventionally provided with a plurality of radially directed slots 24 therein. In Fig. 1 a piece of work, here indicated as a shaft 26, is shown mounted at one end of the center 20, it being understood that the opposite end of the shaft 26 will be mounted on a center such as 28 carried by the usual tail stock (not shown) of the lathe in a conventional manner.

The lathe dog of the present invention includes a yoke-like semi-annular main body portion 30 provided approximately centrally between its opposite ends with a radially outwardly directed ear or lug 32. The ear 32 is centrally apertured as at 34 (see Fig. 3) in perpendicular relationship with respect to the plane of the main body member 30 and loosely received within the bore 34 is one end of a stud 36 provided between its ends with a radially outwardly directed internal flange or shoulder 38 thereon. The end of the stud 36 received within the ear 32 is reduced in diameter and threaded as at 40 so as to provide a radial shoulder 42 thereon against which and over the threaded end 40 is received a washer 44 followed by a nut 46 which rigidly fixes the washer 42 in position. As best brought out in Fig. 3 the distance between the inner face of the washer 44 and the opposed face of the shoulder or flange 38 is preferably greater than the corresponding length of the ear 32 so that the ear 32, and therefore the body member 30, has a limited amount of axial play between them. This play coupled with the loose fit of the stud 36 in the bore 34 of the ear 32 mounts the main body member 30 for a limited amount of universal movement with respect to the stud 36 and also for a small amount of bodily shiftable movement in all directions about the axis of the stud 36 and longitudinally thereof.

The opposite end of the stud 36 projects through one of the slots 24 in the face plate 22 and on the back face of the same receives a nut 48 thereon. The face plate 22 is thereby relatively clamped between the flange or shoulder 38 and the nut 48 to rigidly fix the stud 36 with respect to the face plate 22. The stud 36 is fixed to the face plate radially of one of the slots 34 at such position that the center of curvature of the main body portion 30 is substantially on the axis of the spindle 24, center 20 and the face plate 22.

Threaded through one of the arms of the main body portion 30, shown as the lower arm in Fig. 2, and in a direction radial with respect to the center 20 when operatively positioned with respect to a piece of work supported thereby, is a screw 50, preferably having a serrated or otherwise roughened work-engaging end surface 52 the preferred character of which is best brought out in Fig. 5. A lock nut 54 threaded on the screw 50 is adapted to bear against the outer face of the main body member 30 to lock the screw 50 in radially adjusted position with respect to the axis of a piece of work mounted in the associated lathe.

Rotatably mounted in the opposite end of the main body portion 30 for pivotal movement about an axis parallel to the stud 36, or at least the bore 34, by means of a shouldered pin 60 is a cam member 62. The cam member 62, as best brought out in Fig. 2, in the particular case shown by illustration is in the form of a disc mounted eccentrically on the pin 60 and in such position that its periphery projects radially inwardly beyond the inner surface of the main body portion 30. That surface of the cam 62 arranged to contact the work is serrated or otherwise roughened as indicated at 64.

An outwardly projecting member 66 is rigidly fixed to the cam 62 and preferably formed integrally therewith and is arranged with its center of mass in eccentric relation with respect to the axis of the pin 60. The principal object of the member 66 is to provide a mass movable under the influence of centrifugal force when the face plate 22 is rotated to move the cam 62 into gripping relation with respect to a piece of work such as 26, and although it may be formed otherwise than shown and a separate handle provided for manually rotating the cam 62, it is preferably formed to simultaneously provide a handle as shown. The handle 66 is so arranged with respect to the cam 62 when the dog is correctly adjusted for a particular size of workpiece that its center line is disposed in angularly offset relation in face view with respect to a radial line passing through the axis of the work 26 and through the point of contact of the cam 62 with the work, so that when a piece of work such as 26 is gripped between the screw 50 and the cam 62 and the face plate 22 is rotated, the centrifugal force acting on the center of mass of the handle 66 will tend to rotate the cam 62 in a direction to increase the grip of the dog upon the work. Moreover, the cam 62 is preferably so arranged that it is required to rotate in a counterclockwise direction of rotation about the axis of the pin 60, when viewed as in Fig. 2, to reduce the effective distance between it and the screw 50.

It will be appreciated that by the above-described arrangement any resistance offered to turning of the work 26 with the face plate 22, either because of friction between the work and the center in the tail stock, from the resistance offered to turning by a cutting tool engaging the work, or for any other reason, will tend to turn the cam 62, through frictional engagement between the work and the cam, in a direction to tighten the grip of the cam on the work. Likewise, the center of mass of the handle 62 is arranged on that side of a line passing radially through a piece of work gripped by the dog and through the point of contact of the cam 62 therewith which will turn the cam 62 in the same direction and thus add to the gripping effect of the cam 62 on the work caused by resistance to rotation of the work 26.

As best brought out in Fig. 2, the cam 62 is preferably so located that when a piece of work is gripped between the screw 50 and the cam 62 the points of contact of the screw and the cam lie on a line such as 70 which passes diametrically through the work 26, this insuring against any tendency of the work 26 to slip to either one side or the other under the clamping force exerted by the dog.

It will also be appreciated that the dog thus described is capable of receiving substantially any diameter of workpiece capable of being received within the main body portion 30 thereof, adjustment of the screw 50 axially thereof providing an adjustment for adapting the dog to various diameters of workpieces.

In practice and when the dog is to be employed on the workpiece of a diameter to which it is not adjusted, the screw 50 is backed off, if necessary, to enable the workpiece to be received by the dog, the workpiece is first mounted between the centers of the lathe, and the screw 50 is adjusted until the arm 66 is in the approximate relative position illustrated in Fig. 2 when the work is gripped diametrically between the screw 50 and the dog 62. The nut 48 is then tightened up to lock the stud 36 in such position and the lock nut 54 is tightened to lock the screw 50 in such position. Thereafter, when it is desired to remove the work, the lathe is stopped, the face plate is preferably turned until the dog is in the relative position illustrated in Fig. 2 so that the open side of the dog is toward the operator, whereupon the tail stock center is run back, the work removed and replaced by a new piece of work and the tail stock center is tightened up for proper support thereof. Once the workpiece is thus introduced between the centers, the lathe may then be simply started up, upon which the centrifugal force thus caused to act on the handle 66 will cause the cam 62 to rotate, draw the end 52 of the screw 50 into contact with the work, and securely clamp the work between the end 52 of the screw 50 and the serrated face of the cam 62. As above explained, any resistance applied to the work during rotation automatically has the effect of increasing the gripping force of the dog on the work due to relative rotation of the cam 62 in the proper direction. When the operation on the work is completed, the lathe is stopped, the handle 66 rotated in a clockwise direction about the axis of the pin 60, as viewed in Fig. 2, the work removed and replaced by a new piece of work, whereupon the operation is repeated.

If, when the dog thus tightens itself up on a piece of work, the surface of the work is not parallel with the axis of rotation of the work, a condition which would tend to throw the plane of the main body portion 30 of the dog out of parallelism with the plane of the face plate 22, because of the type of connection between the main body portion 30 and the stud 36 previously described as providing a slight amount of universal movement between them, the dog may properly adjust itself to the work without any interference whatever. Additionally, any bodily shiftable movement of the main body portion in a plane parallel to the face plates 22 required to properly position the dog with respect to the work is automatically taken care of through the looseness of fit of the stud 36 in the bore 34 of the ear 32.

Although not necessary, it is desirable to provide spring means associated with the cam 62 constantly urging the cam 62 in a direction to clamp the piece of work between it and the screw 50 so as to insure immediate rotation of the work with the dog the moment the lathe is started in rotation. While any suitable means may be provided for this purpose, in the particular construction shown by way of illustration a torsion spring 72 is wound about the shouldered pin 60 and one end thereof is extended and its end portion bent axially as indicated at 74 in Fig. 1 and projected through an opening such as 76 in the handle 66, as illustrated in Fig. 2, to anchor such end with respect to the handle 66. The opposite end is bent axially in the opposite direction as indicated at 78 in Fig. 2 and is engaged in one of a series of notches 80 formed in the periphery of the head of the pin 60. The tension of the spring 72 is such as to rotate the cam 62 in a counterclockwise direction of rotation as viewed in Fig. 2. The tension of the spring may be readily adjusted by shifting the end 78 from one notch 80 to another.

When such spring is employed to constantly urge the cam 62 in one direction of rotation, it is preferable to provide some means for holding the cam 62 in open position against the force of the spring when work is being removed from and applied to the dog. Such means may comprise, for instance and as illustrated in Fig. 4, a plunger 82 mounted for axial movement in the arm 66 in perpendicular relationship with respect to the general plane thereof. The inner end of the plunger 82 is provided with a semi-spherical end 84 received in a counterbored portion 86 of the opening for the pin 82 and constantly urged toward a projecting relation with respect to the arm by means of a coil spring 88 surrounding the pin 82 within the recess 86 and maintained under compression between the head 84 and the bottom of the recess. A nut 90 on the opposite end of the pin 82 serves to limit the amount which the end 84 may project from the underside of the arm 66. To cooperate with the end 84 to releasably lock the arm 66 and, therefore, the cam 62 in a released position, an opening 92 is formed in the main body portion 30 in a position to receive the end 84 therein when the arm 66 is swung to such open position of the dog. The force of the spring 88 is, of course, sufficient to maintain the end 84 of the pin 82 in the hole 92 until caused to withdraw therefrom by manual pressure applied to the handle 66.

Having thus described our invention, what we claim by Letters Patent is:

1. A lathe dog comprising, in combination, a member adapted for securement to the face plate of a lathe, a yoke-like member secured to the first mentioned member for free oscillatable movement with respect thereto, a work engaging stop carried by one arm of said yoke-like member, a work engaging cam-like member pivotally mounted on the opposite arm of said yoke-like member, and an off center mass rigid with said cam-like member adapted to be operated by centrifugal force to move said cam-like member in a direction to reduce the effective distance between it and said stop member.

2. A lathe dog comprising, in combination, a yoke member, means for mounting said yoke member between its ends for free swivable movement, a stop member carried by one end of said yoke and projecting therefrom towards the opposite end of said yoke member, a cam member rotatably mounted in the opposite end of said yoke member for movement about an axis perpendicular to the general plane of said yoke member, and an off center mass fixed with respect to said cam member.

3. A lathe dog comprising, in combination, a yoke member, means operatively engaging said yoke member between the ends thereof mounting said yoke member for relatively free oscillatable movement in the general plane of said yoke member, a stop member carried by one end of said yoke member and projecting therefrom towards the opposite end of said yoke member, a cam member rotatably mounted on said other end of said yoke member and arranged to grip a piece of work between it and said stop member, and an eccentric mass rigid with respect to said cam member tending to operate under the effect of centrifugal force to which said dog is subjected in operation to move said cam member in a direction to decrease the effective distance between it and said stop member.

4. A lathe dog comprising, in combination, a yoke member, means operatively engaging said yoke member between the ends thereof mounting said yoke member for relatively free oscillatable movement in the general plane of said yoke member and for a limited amount of relatively free bodily shiftable movement in said plane, a stop member carried by one end of said yoke member and projecting therefrom towards the opposite end of said yoke member, a cam member rotatably mounted on said other end of said yoke member and arranged to grip a piece of work between it and said stop member, and an eccentric mass rigid with respect to said cam member tending to operate under the effect of centrifugal force to which said dog is subjected in operation to move said cam member in a direction to decrease the effective distance between it and said stop member.

5. A lathe dog comprising, in combination, a yoke member, means operatively engaging said yoke member between the ends thereof mounting said yoke member for relatively free oscillatable movement in the general plane of said yoke member and for a limited amount of relatively free universal movement with respect thereto, a stop member carried by one end of said yoke member and projecting therefrom towards the opposite end of said yoke member, a cam member rotatably mounted on said other end of said yoke member and arranged to grip a piece of work between it and said stop member, and an eccentric mass rigid with respect to said cam member tending to operate under the effect of centrifugal force to which said dog is subjected in operation to move said cam member in a direction to decrease the effective distance between it and said stop member.

6. A lathe dog comprising, in combination, a yoke member, means operatively engaging said yoke member between the ends thereof mounting said yoke member for relatively free oscillatable movement in the general plane of said yoke member for a limited amount of free bodily shiftable movement in said plane and a limited amount of universal movement with respect thereto, a stop member carried by one end of said yoke member and projecting therefrom towards the opposite end of said yoke member, a cam member rotatably mounted on said other end of said yoke member and arranged to grip a piece of work between it and said stop member, and an eccentric mass rigid with respect to said cam member tending to operate under the effect of centrifugal force to which said dog is subjected in operation to move said cam member in a direction to decrease the effective distance between it and said stop member.

7. A lathe dog comprising, in combination, a yoke member, pivotal mounting means adapted to be fixed with respect to a face plate of a lathe operatively engaging said yoke member between the ends thereof mounting said yoke member for free oscillatable movement in the general plane of said yoke member, a work engaging stop screw threaded through one end of said yoke member and projecting inwardly therebeyond toward the opposite end of said yoke member, a cam member rotatably mounted on said other end of said yoke member and arranged to grip a piece of work between it and said stop member, and an eccentric mass rigid with respect to said cam member tending to operate under the effect of centrifugal force to which said dog is subjected in operation to move said cam member in a direction to decrease the effective distance between it and said stop member.

8. A lathe dog comprising, in combination, a yoke member, means operatively engaging said yoke member between the ends thereof mounting said yoke member for free oscillatable movement in the general plane of said yoke member, a stop member carried by one end of said yoke member and projecting therefrom towards the opposite end of said yoke member, a cam member rotatably mounted on said other end of said yoke member and arranged to grip a piece of work between it and said stop member, an eccentric mass rigid with respect to said cam member tending to operate under the effect of centrifugal force to which said dog is subjected in operation to move said cam member in a direction to decrease the effective distance between it and said stop member, and spring means constantly urging said cam member in one direction of rotation.

9. A lathe dog comprising, in combination, a yoke member, means operatively engaging said yoke member between the ends thereof mounting said yoke member for relatively free oscillatable movement in the general plane of said yoke member, a work engaging stop screw threaded into one end of said yoke member and projecting inwardly therebeyond towards the opposite end of said yoke member, a cam member rotatably mounted on said other end of said yoke member and arranged to grip a piece of work between it and said stop member, an eccentric mass rigid with respect to said cam member tending to operate under the effect of centrifugal force to which said dog is subjected in operation to move said cam member in a direction to decrease the effective distance between it and said stop member, spring means constantly urging said cam member in one direction of rotation, and means for adjusting the tension of said spring.

10. A lathe dog comprising, in combination, a yoke member, means operatively engaging said yoke member between the ends thereof mounting said yoke member for relatively free oscillatable movement in the general plane of said yoke member, a work engaging stop screw threaded through one end of said yoke member and projecting inwardly therebeyond toward the opposite end of said yoke member, a cam member rotatably mounted on said other end of said yoke member and arranged to grip a piece of work between it and said stop member, an eccentric mass rigid with respect to said cam member tending to operate under the effect of centrifugal force to which said dog is subjected in operation to move said cam member in a direction to decrease the effective distance between it and said stop member, spring means constantly urging said cam member in one direction of rotation, and means cooperating between said cam and member for releasably locking said cam against movement under the force of said spring.

11. A lathe dog comprising, in combination, a yoke member, means for mounting said yoke member between its ends for relatively free swivable movement, a stop member carried by one end of said yoke and projecting therefrom towards the opposite end of said yoke member, a cam member rotatably mounted in the opposite end of said yoke member for movement about an axis perpendicular to the general plane of said yoke member, and a handle rigidly fixed with respect to said cam and projecting radially therefrom providing an off center mass operative under centrifugal force to which it is subjected to in operation tending to move said cam toward work engaging position.

12. A lathe dog structure adapted for permanent securement to the face plate of a lathe and comprising, in combination, a member adapted to at least partially surround a piece of work, stop means carried by said member adapted to engage a piece of work at one side thereof, cam means rotatably carried by said member adapted to engage a piece of work at that side thereof opposite the first-mentioned side and force said work against said stop means, said cam means operating in a direction to increase the clamping effect between it and said stop means due to a cutting operation on a piece of work driven thereby, and a support for said member adapted for fixed securement to the face plate of a lathe, the connection between said member and said support providing free pivotal movement of said member relative to said support.

13. A lathe dog structure adapted for permanent securement to the fact plate of a lathe and comprising, in combination, a member adapted to at least partially surround a piece of work, stop means carried by said member adapted to engage a piece of work at one side thereof, cam means rotatably carried by said member adapted to engage a piece of work at that side thereof opposite the first-mentioned side and force said work against said stop means, said cam means operating in a direction to increase the clamping effect between it and said stop means due to a cutting operation on a piece of work driven thereby, and a support for said member adapted for fixed securement to the face plate of a lathe, the connection between said member and said support providing free pivotal movement and a limited amount of free universal movement of said member relative to said support.

ROBERT ROE STEWART.
THEODORE R. DE LONG.